(12) United States Patent
Fujihira et al.

(10) Patent No.: US 8,886,913 B2
(45) Date of Patent: Nov. 11, 2014

(54) APPARATUS AND METHOD FOR IDENTIFIER MANAGEMENT

(75) Inventors: Kenji Fujihira, Yokohama (JP); Yoshihiro Ashi, Yokohama (JP); Masayuki Takase, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 147 days.

(21) Appl. No.: 13/462,011

(22) Filed: May 2, 2012

(65) Prior Publication Data

US 2012/0294307 A1 Nov. 22, 2012

(30) Foreign Application Priority Data

May 18, 2011 (JP) .................................. 2011-111834

(51) Int. Cl.
 *G06F 12/00* (2006.01)
 *H04L 12/723* (2013.01)
 *H04L 12/743* (2013.01)
 *H04L 12/741* (2013.01)

(52) U.S. Cl.
 CPC ................ *H04L 45/54* (2013.01); *H04L 45/50* (2013.01); *H04L 45/7453* (2013.01)
 USPC ........................................ 711/216; 370/389

(58) Field of Classification Search
 USPC ....................................................... 370/389
 See application file for complete search history.

(56) References Cited

U.S. PATENT DOCUMENTS

| 6,775,281 B1 | 8/2004 | Brown |
| 7,680,806 B2* | 3/2010 | Qian ..................... 707/999.101 |
| 7,830,877 B2* | 11/2010 | Brown ......................... 370/389 |
| 2003/0026259 A1 | 2/2003 | Brown |
| 2008/0229056 A1 | 9/2008 | Agarwal et al. |
| 2011/0202744 A1* | 8/2011 | Kulkarni et al. .............. 711/216 |
| 2012/0054467 A1* | 3/2012 | Fulton et al. .................. 711/216 |

FOREIGN PATENT DOCUMENTS

| JP | 2003-510963 A | 3/2003 |
| WO | WO 01/24440 A2 | 4/2001 |

* cited by examiner

*Primary Examiner* — Huy D Vu
*Assistant Examiner* — Kevin Cunningham
(74) *Attorney, Agent, or Firm* — Crowell & Moring LLP

(57) ABSTRACT

An identifier management apparatus capable of setting identifier conversion information of a new user without affecting identifier conversion processings of other users, and an identifier management method. The identifier management apparatus converts an identifier given to communication data. Its memory stores multiple hash functions, output values of the hash functions corresponding to the respective plurality of hash functions, multiple entry tables that manage the identifier conversion information indicating a correspondence between the input identifier being an input value of the hash function and an output identifier obtained by converting the input identifier, and a management table for managing a setting status of the identifier conversion information in each entry table. When registering the new identifier conversion information in any entry table, its processor selects an entry table that should register new identifier conversion information depending on setting statuses of the identifier conversion information in the entry tables.

10 Claims, 14 Drawing Sheets

FIG. 5A 28c-1 HASH FUNCTION H1

| HASH INPUT VALUE (USER ID "L0") 101 | | | | | | | | | HASH OUTPUT VALUE A1 102 |
|---|---|---|---|---|---|---|---|---|---|
| 0 | 1 | 14 | 15 | 18 | 19 | 28 | 29 | ·· | 0 |
| 2 | 3 | 12 | 13 | 16 | 17 | 30 | 31 | ·· | 1 |
| 6 | 7 | 8 | 9 | 20 | 21 | 26 | 27 | ·· | 2 |
| 4 | 5 | 10 | 11 | 22 | 23 | 24 | 25 | ·· | 3 |

FIG. 5B 28c-2 HASH FUNCTION H2

| HASH INPUT VALUE (USER ID "L0") 115 | | | | | | | | | HASH OUTPUT VALUE A2 116 |
|---|---|---|---|---|---|---|---|---|---|
| 0 | 4 | 9 | 13 | 19 | 23 | 26 | 30 | ·· | 0 |
| 3 | 7 | 10 | 14 | 16 | 20 | 25 | 29 | ·· | 1 |
| 2 | 6 | 11 | 15 | 17 | 21 | 24 | 28 | ·· | 2 |
| 1 | 5 | 8 | 12 | 18 | 22 | 27 | 31 | ·· | 3 |

FIG. 6A    29c-1 ENTRY TABLE E1 (BEFORE CHANGE)

| HASH OUTPUT A1 | USER ID L0 | INTERNAL ID |
|---|---|---|
| 0 | – | – |
| 1 | – | – |
| 2 | – | – |
| 3 | – | – |

FIG. 6B    29c-2 ENTRY TABLE E2 (BEFORE CHANGE)

| HASH OUTPUT A2 | USER ID L0 | INTERNAL ID |
|---|---|---|
| 0 | 0 | 1 |
| 1 | – | – |
| 2 | – | – |
| 3 | – | – |

FIG. 6C    29c-1 ENTRY TABLE E1 (AFTER CHANGE)

| HASH OUTPUT A1 | USER ID L0 | INTERNAL ID |
|---|---|---|
| 0 | – | – |
| 1 | – | – |
| 2 | – | – |
| 3 | – | – |

FIG. 6D    29c-2 ENTRY TABLE E2 (AFTER CHANGE)

| HASH OUTPUT A2 | USER ID L0 | INTERNAL ID |
|---|---|---|
| 0 | 0 | 1 |
| 1 | – | – |
| 2 | 2 | 0 |
| 3 | – | – |

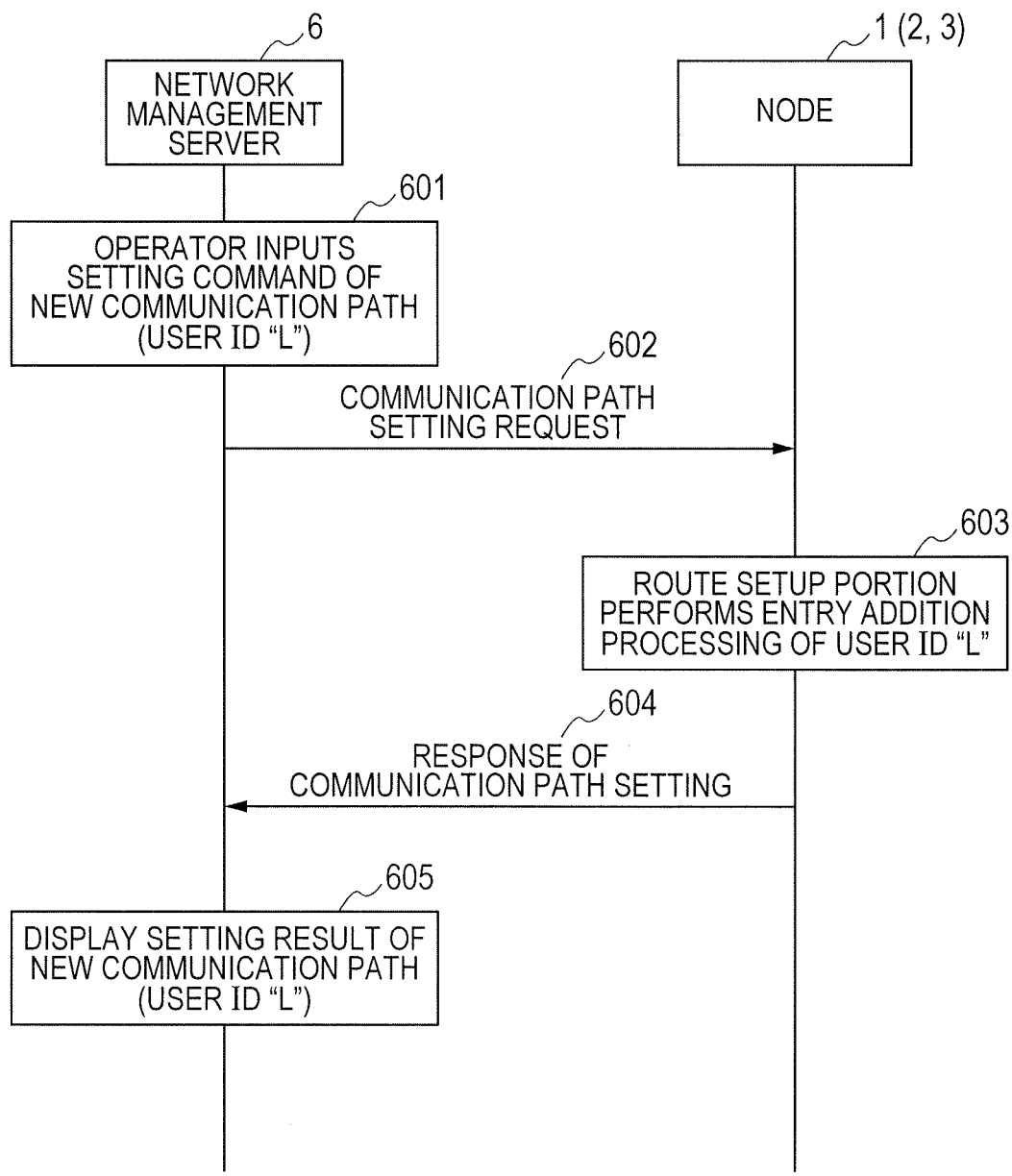

FIG. 10A 28c-1 HASH FUNCTION H1

| HASH INPUT (USER ID L0) ~201 | | | | | | | | | HASH OUTPUT A1 ~202 |
|---|---|---|---|---|---|---|---|---|---|
| 0 | 1 | 14 | 15 | 18 | 19 | 28 | 29 | ·· | 0 |
| 2 | 3 | 12 | 13 | 16 | 17 | 30 | 31 | ·· | 1 |
| 6 | 7 | 8 | 9 | 20 | 21 | 26 | 27 | ·· | 2 |
| 4 | 5 | 10 | 11 | 22 | 23 | 24 | 25 | ·· | 3 |

FIG. 10B 28c-2 HASH FUNCTION H2

| HASH INPUT (USER ID L0) ~215 | | | | | | | | | | | | HASH OUTPUT A1 ~216 |
|---|---|---|---|---|---|---|---|---|---|---|---|---|
| 0 | 4 | 9 | 13 | 19 | 23 | 26 | 30 | 1 | 12 | 27 | ·· | 0 |
| 3 | 7 | 10 | 14 | 16 | 20 | 25 | 29 | 5 | 18 | 28 | ·· | 1 |
| 2 | 6 | 11 | 15 | 17 | 21 | 24 | 28 | 8 | 22 | ·· | ·· | 2 |

FIG. 11A 29c-1 ENTRY TABLE E1 (BEFORE CHANGE)

| HASH OUTPUT A1 | USER ID L0 | INTERNAL ID |
|---|---|---|
| 0 | – | – |
| 1 | – | – |
| 2 | – | – |
| 3 | – | – |

FIG. 11B 29c-2 ENTRY TABLE E2 (BEFORE CHANGE)

| HASH OUTPUT A2 | USER ID L0 | INTERNAL ID |
|---|---|---|
| 0 | 0 | 1 |
| 1 | – | – |
| 2 | – | – |

29c ENTRY TABLE E2 (BEFORE CHANGE)

FIG. 11C 29c-1 ENTRY TABLE E1 (AFTER CHANGE)

| HASH OUTPUT A1 | USER ID L0 | INTERNAL ID |
|---|---|---|
| 0 | – | – |
| 1 | – | – |
| 2 | – | – |
| 3 | – | – |

FIG. 11D 29c-2 ENTRY TABLE E2 (AFTER CHANGE)

| HASH OUTPUT A2 | USER ID L0 | INTERNAL ID |
|---|---|---|
| 0 | 0 | 1 |
| 1 | – | – |
| 2 | 2 | 0 |

FIG. 12A

30 ENTRY NUMBER TABLE (BEFORE CHANGE)

| ENTRY TABLE (281) | TABLE SIZE (282) | NUMBER OF ENTRIES (283) | NUMBER OF EMPTY ENTRIES (284) |
|---|---|---|---|
| E1 | 4 | 0 | 4 |
| E2 | 3 | 1 | 2 |

FIG. 12B

30 ENTRY NUMBER TABLE (AFTER CHANGE)

| ENTRY TABLE (281) | TABLE SIZE (282) | NUMBER OF ENTRIES (283) | NUMBER OF EMPTY ENTRIES (284) |
|---|---|---|---|
| E1 | 4 | 0 | 4 |
| E2 | 3 | 2 | 1 |

FIG. 14A    41 ENTRY TABLE E1 (BEFORE RELOCATION)

| HASH OUTPUT A1 | USER ID L0 | INTERNAL ID |
|---|---|---|
| 0 | — | — |
| 1 | 2 | 0 |
| 2 | — | — |
| 3 | — | — |

PRIOR ART

FIG. 14B    42 ENTRY TABLE E2 (BEFORE RELOCATION)

| HASH OUTPUT A2 | USER ID L0 | INTERNAL ID |
|---|---|---|
| 0 | 0 | 1 |
| 1 | — | — |
| 2 | — | — |
| 3 | — | — |

PRIOR ART

FIG. 15A    41 ENTRY TABLE E1 (DURING RELOCATION)

| HASH OUTPUT A1 | USER ID L0 | INTERNAL ID |
|---|---|---|
| 0 | — | — |
| 1 | — | — |
| 2 | — | — |
| 3 | — | — |

PRIOR ART

FIG. 15B    42 ENTRY TABLE E2 (DURING RELOCATION)

| HASH OUTPUT A2 | USER ID L0 | INTERNAL ID |
|---|---|---|
| 0 | 0 | 1 |
| 1 | — | — |
| 2 | — | — |
| 3 | — | — |

PRIOR ART

FIG. 16A

41 ENTRY TABLE E1 (AFTER RELOCATION)

| HASH OUTPUT A1 | USER ID L0 | INTERNAL ID |
|---|---|---|
| 0 | — | — |
| 1 | — | — |
| 2 | — | — |
| 3 | — | — |

PRIOR ART

FIG. 16B

42 ENTRY TABLE E2 (AFTER RELOCATION)

| HASH OUTPUT A2 | USER ID L0 | INTERNAL ID |
|---|---|---|
| 0 | 0 | 1 |
| 1 | — | — |
| 2 | 2 | 0 |
| 3 | — | — |

PRIOR ART

APPARATUS AND METHOD FOR IDENTIFIER MANAGEMENT

CLAIM OF PRIORITY

The present application claims priority from Japanese patent application JP 2011-111834 filed on May 18, 2011, the content of which is hereby incorporated by reference into this application.

FIELD OF THE INVENTION

The present invention relates to an identifier management apparatus and more specifically to an identifier management apparatus of converting a user identifier in a communication system that manages a communication connection for every user.

BACKGROUND OF THE INVENTION

The amount of information circulating in an office network increases every year, and importance of a communication service intended for corporate users has become increasingly higher. Then, telecommunications carriers install communication networks for connecting in-house LANs (Local Area Networks) arranged at multiple bases for the corporate users and provide a band guarantee service that secures a band for every corporate user. As one example, they advance introduction of the communication system to which MPLS-TP (Multi Protocol Label Switching-Transport Profile) that realizes band guarantee is applied by establishing a path whose bandwidth is secured in advance in an end-to-end manner.

Moreover, with expansion of a demand for the communication services intended for corporate users, there are required realization of a wide band that is for increasing management efficiency of communication services intended for a large number of corporate users and high reliability that is for communicating important data (e.g., user data) surely. Furthermore, in order to reduce a maintenance cost of the communication system, power consumption reduction of each communication device with which the communication system is equipped is demanded.

The telecommunications carriers are considering introduction of a band guarantee technology that supports 100 Gbps (Gigabit per second) high speed communication. In order to realize high speed communication, each communication device converts a value of the user ID (the user Identifier) specified by an administrator of a telecommunications carrier's network into an internal ID (an internal Identifier) handled within the device at high speed.

For example, in the above-mentioned MPLS-TP, a range that a value of the user ID can take is provided to be 20 bits, i.e., a maximum of 1,048,575 as a standard code. Therefore, the user ID specified by the administrator of the telecommunications carrier's network is a 20-bit value, and the same 20-bit value is given to a main signal frame. However, the number of users managed by the communication system is generally smaller than 1,048,575. Therefore, in each communication device, a high speed communication is efficiently realized by changing the user ID specified by the administrator of the telecommunications carrier's network into the internal ID whose range of allowable values is a number manageable by the communication device.

A system is known that realizes a processing of converting the user ID into the internal ID at high speed by using CAM (Content Addressable Memory). However, since the chip on which CAM is mounted has a large power consumption, it comes with a problem that a maintenance cost of the communication system becomes large. As a technology for solving this problem, a technology disclosed in Japanese Unexamined Patent Application Publication (Translation of PCT Application) No. 2003-510963 is known.

Japanese Unexamined Patent Application Publication (Translation of PCT Application) No. 2003-510963 discloses a system of converting the user ID into the internal ID at high speed by using a hash function of compressing a value range without using CAM.

Generally, in the case of using the hash function, there occurs an event where an identical output value is outputted to multiple input values, i.e., what is called a collision. On the other hand, according to the technology disclosed by Japanese Unexamined Patent Application Publication (Translation of PCT Application) No. 2003-510963, it is possible to reduce an occurrence probability of the collision and to determine the internal ID at high speed by performing a parallel processing using multiple hash functions.

Incidentally, in the technology disclosed by Japanese Unexamined Patent Application Publication (Translation of PCT Application) No. 2003-510963, multiple entry tables (hash tables) are used when converting the user ID into the internal ID. The entry table manages a correspondence between the user ID and the internal ID for every user, i.e., information on identifier conversion for every user. In setting a new user's entry (a new entry) in this entry table, the correspondence between the user ID of the new user and the internal ID is set in a portion in which entry setting is possible in the entry table.

On the other hand, if there is no portion in which the entry setting is possible in the entry table, a set-up entry that has already been set up is relocated, and subsequently the new entry is set up. Incidentally, the case where there is no portion in which entry setting is possible is a case where the number of entries already set up is larger than the number of entry tables, that is, a case where the new entry cannot be set up in any of the entry tables.

SUMMARY OF THE INVENTION

Digressing a moment, a band guarantee service requires high reliability that enables important data to be communicated certainly, as described above. Especially, when setting a new entry in an entry table, it is required not to affect communication of the user related to an entry already set up (including an identifier conversion processing). Influence here referred to is generation of communication disconnection or packet loss, for example.

However, by the technology disclosed by Japanese Unexamined Patent Application Publication (Translation of PCT Application) No. 2003-510963, in setting the new entry in the entry table, if there is no portion in which entry setting is possible in the entry table, the above-mentioned relocation processing will be performed, but it has a problem that the communication disconnection and the packet loss related to an entry already set up occur during execution of this relocation processing. This problem will be explained using FIG. 14A to FIG. 16B.

FIG. 14A is a diagram showing one example of an entry table E1 (41) before entry relocation in the conventional technology. FIG. 14B is a diagram showing one example of an entry table E2 (42) before the entry relocation in the conventional technology. Let it be assumed that, for example, the two entry tables E1, E2 shown in FIG. 14A and FIG. 14B exist.

The entry table E1 (41) manages a correspondence among a hash output value A1 (701) of a hash function H1, a user ID "L0" (702), and an internal ID (703). Here, one entry 705 in which the hash output value A1 (=1), the user ID (=2), and the internal ID (=0) are associated with one another is set up.

On the other hand, the entry table E2 (42) manages a correspondence among a hash output value A2 (708) of a hash function H2 different from the hash function H1, the user ID "L0" (709), and the internal ID (710). Here, one entry 711 in which the hash output value A2 (=0), the user ID (=0), and the internal ID (=1) are associated with one another is set up.

Here, when newly setting up the entries of the hash output value A1=1 and the hash output value A2=0, the entry setup is impossible in both of the entry tables E1, E2. Therefore, a relocation processing that, for example, relocates (moves) the entry 705 already set up in the entry table E1 to the entry table E2 is performed.

FIG. 15A is a diagram showing one example of the entry table E1 (41) that is under the entry relocation in the conventional technology. FIG. 15B is a diagram showing one example of the entry table E2 (42) that is under the entry relocation in the conventional technology.

The entry already set up 705 is deleted in the entry table E1 shown in FIG. 15A. On the other hand, the entry table E2 shown in FIG. 15B is the same as the entry table E2 shown in FIG. 14B. Incidentally, in the state during the relocation shown in FIG. 15A and FIG. 15B, the communication disconnection and the packet loss of the user ID "2" corresponding to the entry 705 occur.

FIG. 16A is a diagram showing one example of the entry table E1 (41) after the entry relocation in the conventional technology. FIG. 16B is a diagram showing one example of the entry table E2 (42) after the entry relocation in the conventional technology.

The entry table E1 shown in FIG. 16A is the same as the entry table E1 shown in FIG. 15A. On the other hand, in the entry table E2 shown in FIG. 16B, the entry 705 deleted by the relocation processing is newly set up in the entry 712 of the hash output value A2=2. Thereby, the entry of the hash output value A1=1 and the hash output value A2=0 that should be added can be added in a position of the entry 705 of the entry table E1.

Incidentally, occurrence probabilities of the communication disconnection and the packet loss of the user can be lowered by increasing the number of entry tables. However, memory size limitation makes it difficult to implement a sufficient number of entry tables in order to avoid the above-mentioned relocation processing.

The present invention is devised by consideration of the problem described above and has an object to provide an identifier management apparatus of capable of setting identifier conversion information of a new user (the correspondence among the hash output value, the user ID, and the internal ID) without affecting conversion processing of other users' identifiers, and an identifier management method.

One typical aspect of the invention disclosed in this application will be shown as follows. That is, it is an identifier management apparatus that is equipped with a processor for performing a program and memory for storing the program that is performed by the processor and converts an identifier given to communication data, characterized in that the memory stores multiple hash functions, the output values of the hash functions corresponding to the respective plurality of hash functions, multiple entry tables that manages the identifier conversion information showing a correspondence between an input identifier being an input value of the hash function and an output identifier obtained by converting the input identifier, and a management table for managing a setting status of the identifier conversion information in each of the entry tables, and when registering new identifier conversion information in any one of the entry tables, the processor selects an entry table that should registers the new identifier conversion information depending on the setting status of the identifier conversion information in each of the entry tables managed by the management table.

According to the aspect of the present invention, it is possible to set up the identifier conversion information of a new user without affecting the identifier conversion processings of other users.

BRIEF DESCRIPTION OF THE DRAWINGS

FIG. 5A is a diagram showing one example of a hash function H1 of the first embodiment of the present invention;

FIG. 5B is a diagram showing one example of a hash function H2 of the first embodiment of the present invention;

FIG. 6A is a diagram showing one example of an entry table E1 of the first embodiment of the present invention;

FIG. 6B is a diagram showing one example of an entry table E2 of the first embodiment of the present invention;

FIG. 6C is a diagram showing one example of the entry table E1 of the first embodiment of the present invention;

FIG. 6D is a diagram showing one example of the entry table E2 of the first embodiment of the present invention;

FIG. 9 is a sequence diagram showing one example of the entry addition processing of the first embodiment of the present invention;

FIG. 10A is a diagram showing one example of the hash function H1 of a second embodiment of the present invention;

FIG. 10B is a diagram showing one example of the hash function H2 of the second embodiment of the present invention;

FIG. 11A is a diagram showing one example of the entry table E1 of the second embodiment of the present invention;

FIG. 11B is a diagram showing one example of the entry table E2 of the second embodiment of the present invention;

FIG. 11C is a diagram showing one example of the entry table E1 of the second embodiment of the present invention;

FIG. 11D is a diagram showing one example of the entry table E2 of the second embodiment of the present invention;

FIG. 12A is a diagram showing one example of the entry-number control table of the second embodiment of the present invention;

FIG. 12B is a diagram showing one example of the entry-number control table of the second embodiment of the present invention;

FIG. 14A is a diagram showing one example of the entry table E1 before entry relocation in the conventional technology;

FIG. 14B is a diagram showing one example of the entry table E2 before the entry relocation in the conventional technology;

FIG. 15A is a diagram showing one example of the entry table E1 during the entry relocation in the conventional technology;

FIG. 15B is a diagram showing one example of the entry table E2 during the entry relocation in the conventional technology;

FIG. 16A is a diagram showing one example of the entry table E1 after the entry relocation in the conventional technology; and FIG. 16B is a diagram showing one example of the entry table E2 after the entry relocation in the conventional technology.

DETAILED DESCRIPTION OF THE PREFERRED EMBODIMENTS

Hereafter, embodiments of the present invention will be described based on attached drawings.

First Embodiment

Figure 1:
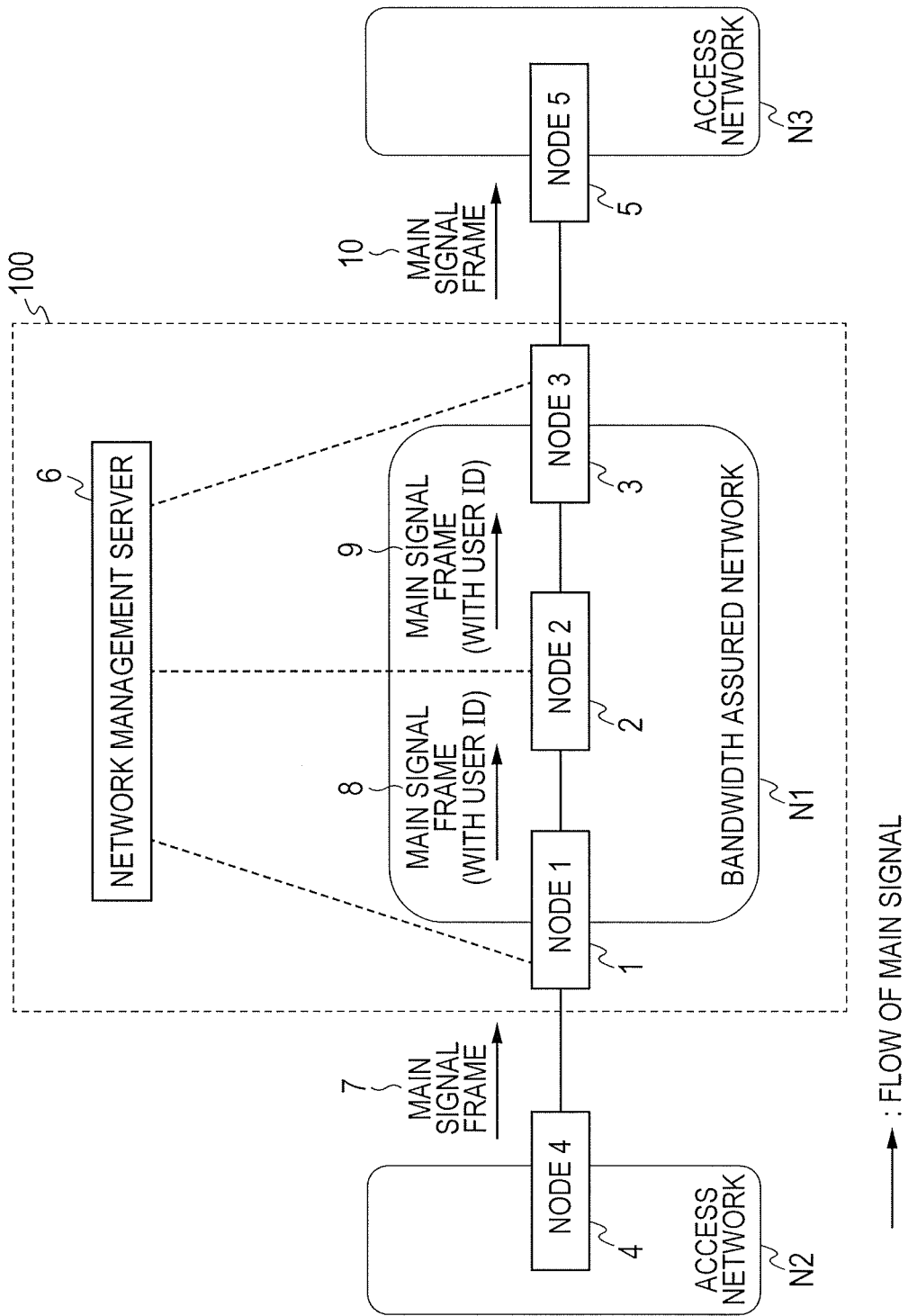
FIG. 1 is a diagram showing a configuration example of a communication system of a first embodiment of the present invention.

FIG. 1 is a diagram showing a configuration example of a communication system 100 of a first embodiment of the present invention. The communication system 100 of the first embodiment of the present invention is equipped with a bandwidth assured network N1 and a network management server 6 for managing the bandwidth assured network N1. The bandwidth assured network N1 has multiple nodes (communication device, identifier management apparatus) 1, 2, and 3.

The node 1 connects with the node 2 and a node 4. The node 4 is a communication device with which an access network N2 is equipped. The node 1 generates a main signal frame 8 by giving the user ID to a main signal frame 7 received from the node 4, and transmits it to the node 2. The user ID is an identifier that is uniquely defined by an administrator of the bandwidth assured network N1 and the nodes 1, 2, and 3 for each user, and is used in identifying the user. The user referred to here may be a user in an organization unit, such as a company and a division in a company, or may be a user of an individual unit.

The node 2 connects with the node 1 and the node 3. The node 2 receives the main signal frame 8 from the node 1, and analyzes the user ID given to the received main signal frame 8. That is, it specifies the node 3 that is a transmission destination being set up in advance by the administrator of the bandwidth assured network N1 according to the given user ID. Then, it transmits a main signal frame 9 identical to the main signal frame 8 to the node 3.

The node 3 connects with the node 2 and a node 5. The node 5 is a communication device with which the access network N3 is equipped. The node 3 receives the main signal frame 9 from the node 2, and analyzes the user ID given to the received main signal frame 9. That is, according to the given user ID, it specifies the node 5 that is a transmission destination being set up in advance by the administrator of the bandwidth assured network N1. Then, it generates a main signal frame 10 by deleting the user ID given to the main signal frame 9, and transmits it to the node 5.

The administrator of the bandwidth assured network N1 sets up in advance a communication path according to the user ID using the network management server 6. As a setting method of the communication path, MPLS-TP is used, for example.

The network management server 6 is connected to the nodes 1, 2, and 3 through a network, such as the Internet. The network management server 6 is equipped with a display, a keyboard, a mouse, etc. (un-illustrated) as input/output interfaces. Using the input/output interfaces with which the network management server 6 is equipped, the administrator of the bandwidth assured network N1 sets up a communication path of the main signal frame 7, that is, a communication path that reaches the node 5 from the node 1 via the node 2 and the node 3.

Figure 2:
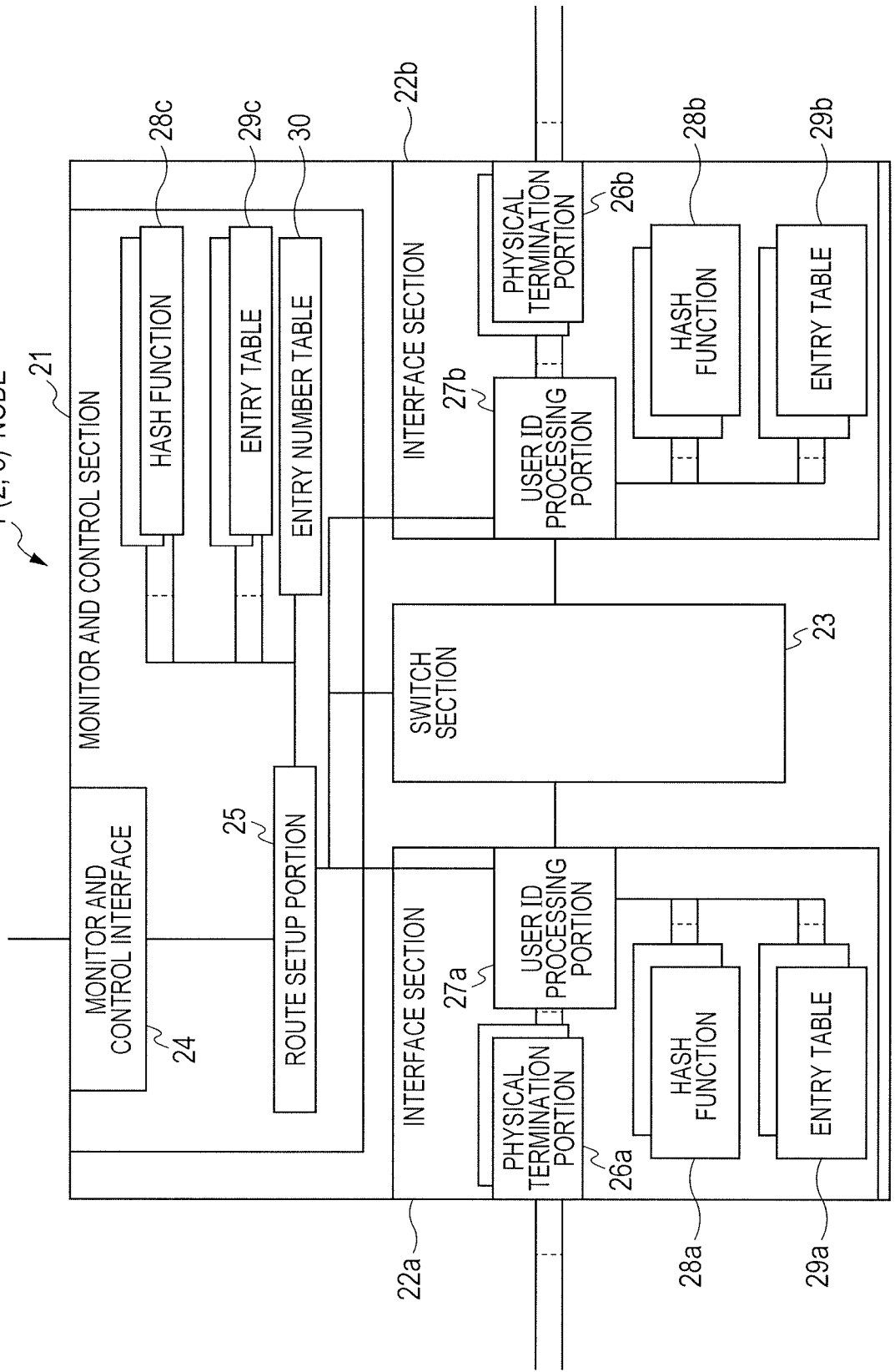
FIG. 2 is a diagram showing one configuration example of a node of the first embodiment of the present invention.

FIG. 2 is a diagram showing one example of a configuration of the node 1 (2, 3) of the first embodiment of the present invention. Incidentally, although the node 1 will be explained as an example below, the nodes 2, 3 are the same.

The node 1 is equipped with a monitor and control section 21, interface sections 22a, 22b, and a switch section 23.

The monitor and control section 21 monitors and controls operations of the node 1. The monitor and control section 21 is equipped with a monitor and control interface 24, a route setup portion 25, multiple hash functions 28c, multiple entry tables 29c, and an entry number table 30.

The monitor and control interface 24 is an interface device for connecting with the network management server 6. For example, it communicates with the network management server 6 by SNMP (Simple Network Management Protocol).

The route setup portion 25 sets up the communication path that the administrator of the bandwidth assured network N1 has set up using the network management server 6 in the node 1. Specifically, the user ID corresponding to the set-up communication path is reflected in the interface sections 22a, 22b. When setting up the communication path using MPLS-TP, the user ID is an MPLS label value.

The hash function 28c is a function that converts a 20-bit user ID, i.e., a value in a range of zero to 1,048,575, into a value in a range of the number of the user IDs that can be set in the node 1, namely, that compresses a value range. The hash function 28c will be described in detail later, referring to FIG. 5A and FIG. 5B.

The entry table 29c is a table for managing the correspondence between the user ID and an internal ID for each user, i.e., information on identifier conversion for each user (identifier conversion information). Specifically, it manages information indicating the correspondence among the user ID (input identifier) being an input value of the hash function 28c, an output value (value with the compressed value range) of the hash function 28c for the user ID, and the internal ID (output identifier) obtained by converting the user ID. The entry table 29c will be described in detail later, referring to FIG. 6A to FIG. 6D.

The entry number table 30 manages a registration status of the identifier conversion information in each of the entry tables 29c. Specifically, it manages the number of entries already set up in each of the entry tables 29c. The entry number table 30 will be described in detail later, referring to FIG. 7A and FIG. 7B.

An interface section 22a is equipped with multiple physical termination portions 26a, a user ID processing portion 27a, multiple hash functions 28a, and multiple entry tables 29a. This interface section 22a is an interface between the node 1 and other nodes for transmitting/receiving the main signal frame.

The physical termination portion 26a is a physical interface for transmitting/receiving the main signal frame. The physical termination portions 26a are connected to a single user ID processing portion 27a.

Upon reception of the main signal frame from the physical termination portion 26a, the user ID processing portion 27a gives the received main signal frame the internal ID according to the user ID, referring to the hash function 28a and the entry table 29a. Then, it transmits the main signal frame to which the internal ID was given to the switch section 23. The processing of giving the internal ID will be described in detail later, referring to FIG. 4.

The hash function 28a is a hash function identical to the hash function 28c. Multiple same hash functions 28 are implemented in advance in the interface section 22 and the monitor and control section 21.

The entry table 29a is the same entry table as the entry table 29c. When the monitor and control section 21 updates the entry table 29c, it transmits the entry table 29c after the update to the interface section 22a. The interface section 22a overwrites (updates) the entry table 29a based on the entry table 29c after the update received from the monitor and control section 21.

Upon reception of the main signal frame to which the internal ID was given from the user ID processing portion 27a, the switch section 23 determines its destination based on the given internal ID and the communication path being set up by the route setup portion 25. Then, the main signal frame to which the internal ID was given is transmitted to a user ID processing portion 27b corresponding to the determined destination.

The interface section 22b is equipped with multiple physical termination portions 26b, the user ID processing portion 27b, multiple hash functions 28b, and multiple entry tables 29b. Below, a point difference from the above-mentioned interface section 22a will be explained.

Upon reception of the main signal frame from the switch section 23, the user ID processing portion 27b selects the physical termination portion 26b based on the internal ID given to the main signal frame. Subsequently, the internal ID is deleted from the main signal frame, which after this operation is transmitted to the selected physical termination portion 26b.

Figure 3:
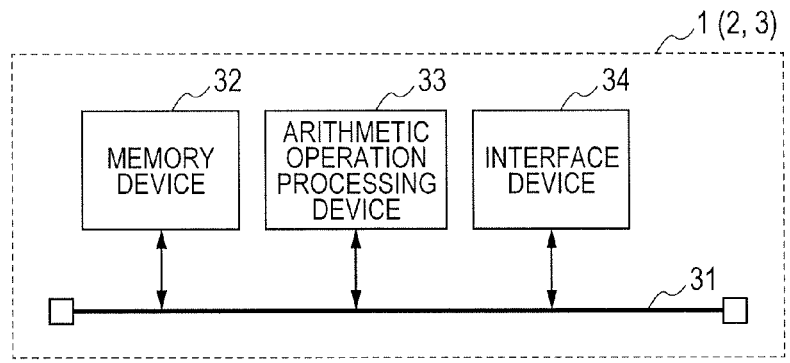
FIG. 3 is a diagram showing a hardware configuration example of the node of the first embodiment of the present invention.

FIG. 3 is a diagram showing a hardware configuration example of the node 1 (2, 3) of the first embodiment of the present invention. The node 1 shown in FIG. 3 is equipped with a memory device 32, a processing device 33, and an interface device 34 that are mutually connected by a bus 31.

The memory device 32 is a storage device, such as RAM (Random Access Memory), for storing a program that realizes functions of the route setup portion 25 shown in FIG. 2. This memory device 32 also stores a file necessary for execution of the program, data (including the hash functions 28c, the entry tables 29c, and the entry number table 30), etc.

The processing device 33 is an arithmetic processing device, such as a CPU (Central Processing Unit), for executing the program stored in the memory device 32. The interface device 34 is an interface device for making connection with an external network etc.

Incidentally, the node 1 may be equipped with, for example, an input device, an output device, an auxiliary storage device, and a drive device for reading data stored in a storage medium (all being unillustrated).

Figure 4:
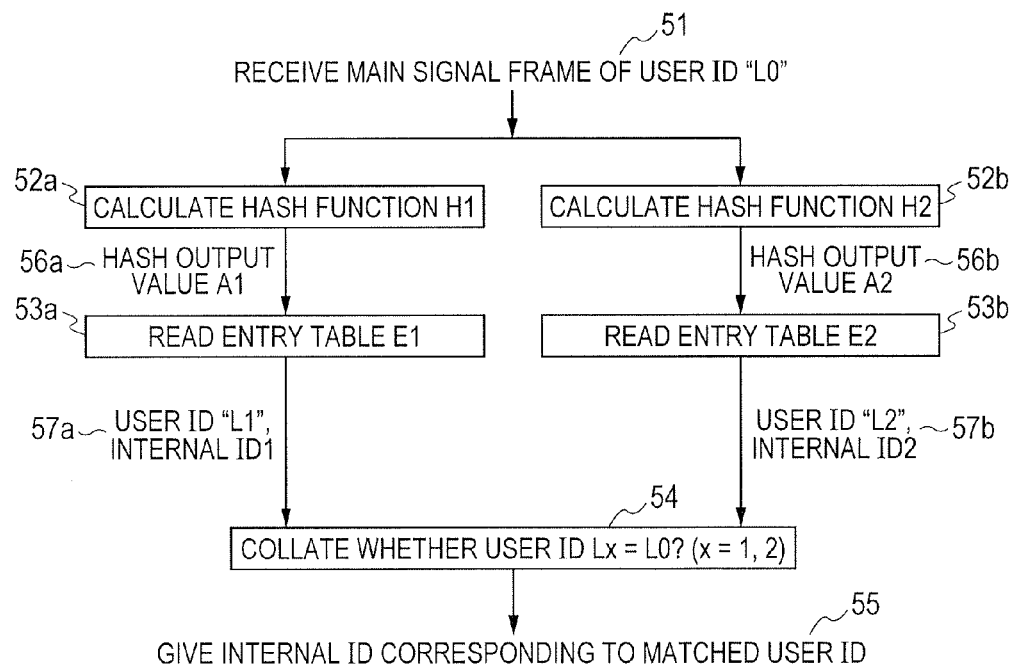
FIG. 4 is a diagram showing one example of an internal ID giving processing by a user ID processing portion of the first embodiment of the present invention.

FIG. 4 is a diagram showing one example of a processing of giving the internal ID by the user ID processing portion 27a of the first embodiment of the present invention. Here, a procedure in which the user ID processing portion 27a gives the internal ID to the main signal frame received from the physical termination portion 26a will be explained.

First, in Step 51, the user ID processing portion 27a receives the main signal frame to which a user ID "L0" was given from the physical termination portion 26a (51).

Next, in Steps 52a, 52b, the user ID processing portion 27a calculates the hash output values A1, A2 of the user ID "L0" that was given to the received main signal frame using multiple hash functions H1, H2, respectively (52a, 52b). Specifically, the user ID "L0" is inputted into the hash functions H1, H2, respectively. Then, the hash output values A1 (56a), A2 (56b) with the compressed value ranges are outputted. Thereby, the user ID processing portion 27a acquires the hash output values A1, A2.

Then, in Steps 53a, 53b, the user ID processing portion 27a reads entry tables E1, E2 having been created in advance (53a, 53b). The entry table E1 is an entry table corresponding to a hash output value A1. That is, it manages the correspondence among the hash output value A1, the user ID, and the internal ID. On the other hand, the entry table E2 is an entry table corresponding to the hash output value A2. That is, it manages the correspondence among the hash output value A2, the user ID, and the internal ID.

The user ID processing portion 27a acquires the user ID "L1" corresponding to the hash output value A1 (56a) and the internal ID (57a), referring to the read entry table E1. Similarly, it acquires the user ID "L2" corresponding to the hash output value A2 (56b) and the internal ID (57b), referring to the read entry table E2.

Subsequently, in Step 54, the user ID processing portion 27a collates the acquired the user IDs (57a, 57b) and the user ID "L0" (54). After that, if there exists the user ID (either of the two user IDs "L1," "L2") that agrees with the user ID "L0," it will give the internal ID corresponding to the user ID to the main signal frame (55).

As described above, by performing a parallel processing using the hash functions H1, H2, the user ID processing portion 27a can reduce an occurrence probability of a collision and can determine the internal ID at high speed.

FIG. 5A is a diagram showing one example of a hash function H1 (28c-1) of the first embodiment of the present invention. FIG. 5B is a diagram showing one example of a hash function H2 (28c-2) of the first embodiment of the present invention. The hash functions 28c include the hash function H1 (28c-1) shown in FIG. 5A and the hash function H2 (28c-2) shown in FIG. 5B.

FIG. 5A and FIG. 5B show the correspondence between an input value (the user ID value) and the output value in the case where the number of the user ID that can be set in the node 1 (or the node 2 or the node 3) is four.

The hash function H1 shown in FIG. 5A inputs the 20-bit user ID, i.e., the input value expressed by a value in a range of zero to 1,048,575, and outputs evenly a 2-bit number corresponding to the input value, i.e., the output value A1 expressed by a value in a range of zero to three. For example, if the input value is the user ID equal to anyone of "0", "1", "14", - - - , the output value A1 will be zero.

Similarly with the hash function H1, the hash function H2 shown in FIG. 5B inputs the 20-bit user ID, and outputs evenly the output value A2 corresponding to the input value. For example, if the input value is the user ID equal to any one of "0", "4", "9", - - - , the output value A2 will be zero.

The route setup portion 25 can compress the value range of the user ID by using the hash functions H1, H2 shown above.

Incidentally, these hash functions H1, H2 are implemented as hardware for performing a logical formula, for example, a CRC (Cyclic Redundancy Check) operation, a remainder arithmetic operation, etc. Moreover, by being equipped with these hash functions H1, H2, the node 1 is enabled to reduce the occurrence probability of the collision as compared with the case where it is equipped with only one hash function. Moreover, although the case where the node 1 is equipped with the two hash functions H1, H2 has been explained here, the node 1 may be equipped with three hash functions or more.

FIG. 6A and FIG. 6C are diagrams showing one example of the entry table E1 (29c-1) of the first embodiment of the present invention. FIG. 6B and FIG. 6D are diagrams showing one example of the entry table E2 (29c-2) of the first embodiment of the present invention. The entry tables 29c include the entry table E1 (29c-1) shown in FIG. 6A (or FIG. 6C) and the entry table E2 (29c-2) shown in FIG. 6B (or FIG. 6D).

Incidentally, FIG. 6A and FIG. 6B show the entry tables E1, E2 before the change, respectively. On the other hand, FIG. 6C and FIG. 6D show the entry tables E1, E2 after the change, respectively. Processings from before to after the change will be described later in a concrete example of FIG. 8.

The entry table E1 is an entry table corresponding to the hash function H1 of FIG. 5A. That is, it manages a correspondence among the hash output value A1 (141) of the hash function H1, the user ID "L0" (142), and the internal ID (143).

On the other hand, the entry table E2 is an entry table corresponding to the hash function H2 of FIG. 5B. That is, it manages a correspondence among the hash output value A2 (148) of the hash function H2, the user ID "L0" (149), and the internal ID (150).

By using the entry tables E1, E2 shown above, the route setup portion 25 can convert the user IDs (the hash output values A1, A2) with the value ranges compressed by the hash functions H1, H2 into the internal IDs at high speed. Incidentally, although the case where the node 1 is equipped with the two entry tables E1, E2 has been explained here, if the number of hash functions is three or more, the node 1 may be equipped with three or more entry tables whose number is the same as the number of the hash functions.

Figure 7A:
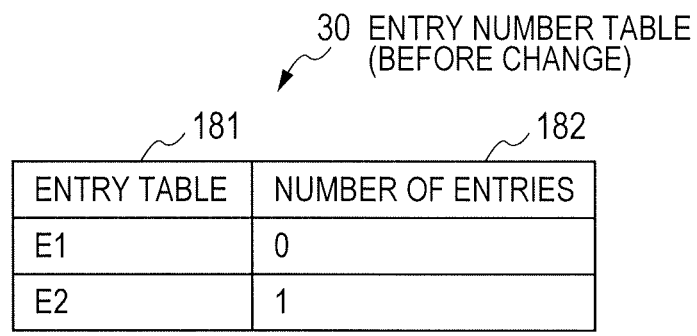
FIG. 7A is a diagram showing one example of the entry-number control table of the first embodiment of the present invention.
Figure 7B:
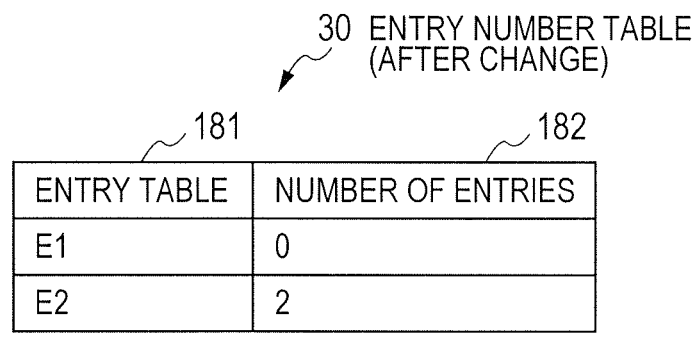
FIG. 7B is a diagram showing one example of the entry-number control table of the first embodiment of the present invention.

FIG. 7A and FIG. 7B are diagrams showing one example of the entry number table 30 of the first embodiment of the present invention. FIG. 7A is the entry number table 30 before the change, which corresponds to the entry tables E1, E2 shown in FIG. 6A and FIG. 6B, respectively. On the other hand, FIG. 7B is the entry number table 30 after the change, which corresponds to the entry tables E1, E2 shown in FIG. 6C and FIG. 6D, respectively.

The entry number table 30 manages a correspondence between the identifier of each entry table 29c (181) and the number of entries already set up (182) in the each entry table 29c, i.e., the number of entries of the each entry table 29c.

In the entry table E1 shown in FIG. 6A, the number of entries already set up is zero. Moreover, in the entry table E2 shown in FIG. 6B, the number of entries already set up is one. Therefore, in the entry number table 30 shown in FIG. 7A, registration is made with the number of entries already set up of the entry table E1 being set to zero and the number of entries already set up of the entry table E2 being set to one.

On the other hand, in the entry table E1 shown in FIG. 6C, the number of entries already set up is zero. Moreover, in the entry table E2 shown in FIG. 6D, the number of entries already set up is two. Therefore, in the entry number table 30 shown in FIG. 7B, registration is made with the number of entries already setup of the entry table E1 being set to zero and the number of entries already set up of the entry table E2 being set to two.

As described above, the entry number table 30 manages the number of entries already set up of the each entry table 29c. This enables the node 1 to select the entry table 29c of a registration destination of a new entry depending on the entry setting status in the each entry table 29c.

Figure 8:
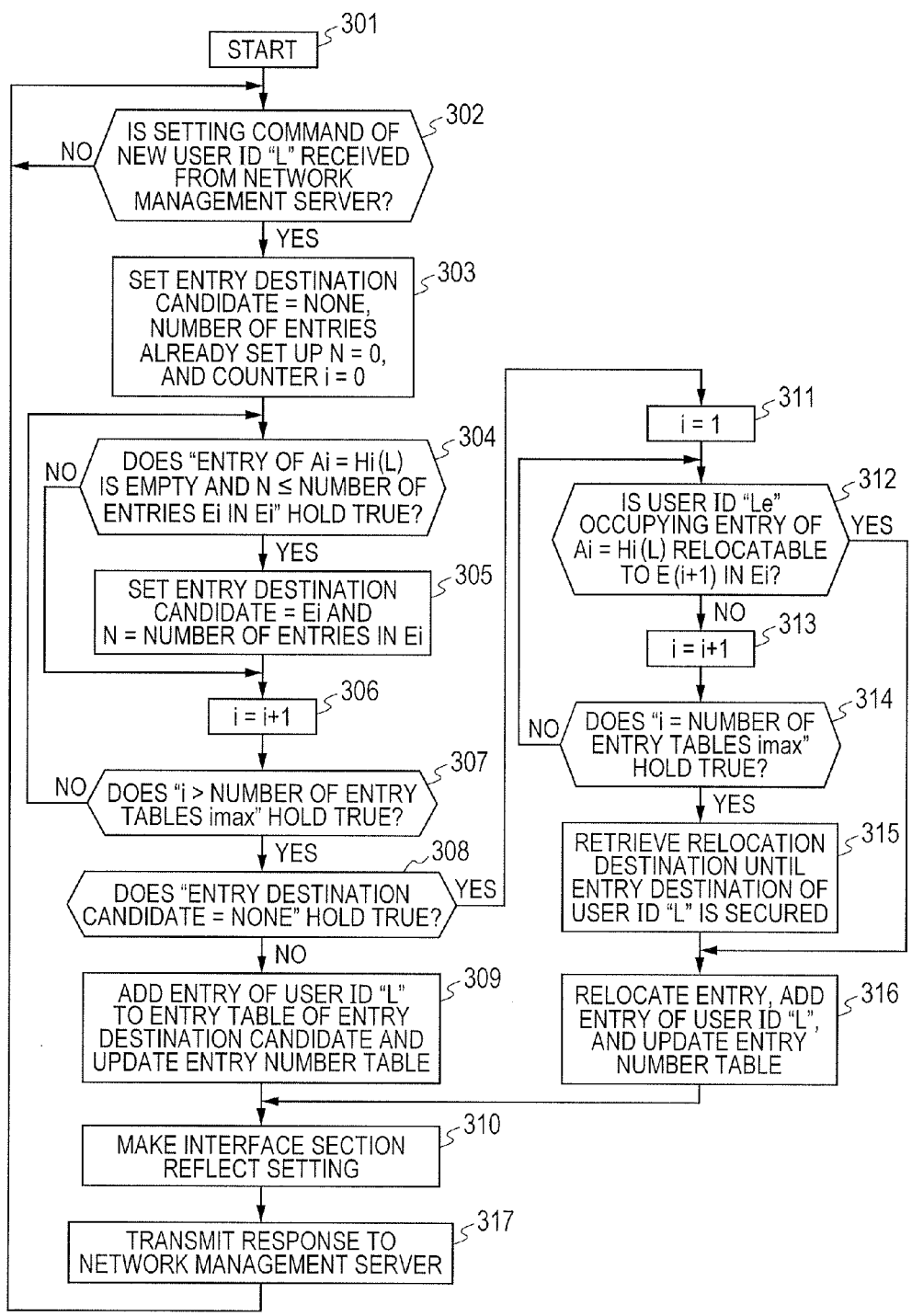
FIG. 8 is a flowchart showing one example of an entry addition processing of the first embodiment of the present invention.

FIG. 8 is a flowchart showing one example of an entry addition processing of the first embodiment of the present invention. Here, a procedure in which the route setup portion 25 adds (registers) the new entry (registration) to the entry table 29c will be explained using a concrete example.

After the processing starts (301), the route setup portion 25 will be in a waiting state until it receives a setting command of a new user ID (e.g., a user ID "L") from the network management server 6 (302). When the setting command of a new user ID "L" is received (YES in 302), "NONE" is set in a variable "entry destination candidate," zero is set in the variable N representing the number of entries already set up, and one is set in a counter i" as initial values, respectively (303).

Next, in the entry table Ei, the route setup portion 25 determines whether an entry whose hash output value Ai is Hi (L) is empty and whether a value of the variable N is equal to or less than the number of entries already set up of the entry table Ei (304). Incidentally, Hi (L) is an output value of the hash function Hi to the input value L.

Specifically, first, it retrieves an entry whose hash output value A1 is H1 (L) in the entry table E1 (FIG. 6A), and checks whether the pertinent entry is empty. For example, if the setting command of a new user ID "L=2" is received in Step 302, the output value of the hash function H1 (FIG. 5A) to the input value two will be one. That is, H1(2)=1 holds true. Therefore, it checks that the entry whose hash output value A1 is one is empty from the entry table E1 (FIG. 6A).

Next, it compares the value of the variable N (here, initial value zero) and the number of entries already set up of the entry table E1, referring to the entry number table 30 (FIG. 7A). In the entry number table 30 (FIG. 7A), the number of entries already set up of the entry table E1 is zero. Therefore, the value of the variable N is equal to or less than the number of entries already set up of the entry table E1. From the above, Step 304 returns a YES answer.

If Step 304 returns the YES answer, the route setup portion 25 sets "Ei" in the variable "entry destination candidate", and sets "the number of entries already set up of the entry table Ei" in the variable N (305). In the above-mentioned concrete example, "E1" is set in the variable "entry destination candidate and zero that is the number of entries already set up of the entry table E1 is set in the variable N. On the other hand, in the case of NO in Step 304 (NO in 304), the processing in Step 305 is not performed.

When control proceeds to Step 306, the route setup portion 25 increments the counter i (306). The counter i becomes i=2 in the above-mentioned concrete example.

Then, the route setup portion 25 determines whether a value of the counter i is larger than the number of entry tables imax (307). If the value of the counter i is equal to or less than the number of entry tables imax (NO in 307), the process returns to Step 304, where the processing is repeated. On the other hand, if the value of the counter i is larger than the number of entry tables imax (YES in 307), the process will proceed to Step 308.

In the above-mentioned concrete example, the value of the counter i is two and the value of the number of entry tables imax is two (two of the entry tables E1, E2). Therefore, since the value of the counter i is equal to or less than the number of entry tables imax (NO in 307), the process returns to Step 304.

When returning to Step 304, the route setup portion 25 retrieves an entry whose hash output value A2 is H2(2) from the entry table E2 (FIG. 6B), and checks whether the pertinent entry is empty. The output value of the hash function H2 (FIG. 5B) to the input value two is two. That is, H2 (2)=2 holds true. Therefore, it checks that the entry whose hash output value A2 is two is empty from the entry table E2 (FIG. 6B).

Next, it compares the value (here zero) of the variable N and the number of entries already set up of the entry table E2 by referring to the entry number table 30 (FIG. 7A). In the entry number table 30 (FIG. 7A), the number of entries already set up of the entry table E2 is one. Therefore, the value of the variable N is equal to or less than the number of entries already set up of the entry table E2. From the above, Step 304 returns a YES answer.

The process proceeds to Step 305, where the route setup portion 25 sets "E2" in the variable "entry destination candidate" and sets one that is the number of entries already set up of the entry table E2 (305). Then, the counter i is incremented to i=3 (306). Then, since the value 3 of the counter i is larger than the number of entry tables imax (=2) (YES in 307), the process proceeds to Step 308.

By processings of Steps 304 to 307 shown above, the route setup portion 25 determines the entry table with a largest number of entries already set up as a registration destination candidate of the new entry using the variable "entry destination candidate" and the variable N.

In Step 308, the route setup portion 25 checks whether the variable "entry destination candidate" is "NONE" (308). If a value of the variable "entry destination candidate" is "NONE" (YES in 308), the process will proceed to Step 311. On the other hand, if the value of the variable "entry destination candidate" is not "NONE", the process will proceed to Step 309 (NO in 308). In the above-mentioned concrete example, since the value of the variable "entry destination candidate" is "E2" (NO in 308), the process proceeds to Step 309.

In Step 309, the route setup portion 25 adds an entry of the user ID "L" to the entry table expressed by the variable "entry destination candidate," and updates the entry number table 30 (309).

In the above-mentioned concrete example, since the value of the variable "entry destination candidate" is "E2," it adds an entry of the user ID "2" to the entry table E2. Incidentally, when adding the new entry, the internal ID related to the new entry shall be a unique value in all the entry tables E1, E2. As a result, the entry Table E1 shown in FIG. 6A and the entry Table E2 shown in FIG. 6B are changed into an entry Table E1 shown in FIG. 6C and an entry Table E2 shown in FIG. 6D, respectively.

Moreover, the route setup portion 25 updates the entry number table 30. In the above-mentioned concrete example, since the number of entries of the entry table E2 is changed from one to two, the entry number table 30 shown in FIG. 7A is changed into the entry number table 30 shown in FIG. 7B.

Then, in Step 310, the route setup portion 25 transmits information of the entry tables E1, E2 (the entry table 29c) after the change to the respective interface sections 22a, 22b (310). The interface sections 22a, 22b overwrite (update) the received information of the entry tables E1, E2 after the change onto the entry tables 29a, 29b with which the respective interface sections 22a, 22b are equipped, respectively. Subsequently, in Step 317, the monitor and control section 21 transmits to the network management server 6 a communication path setting response 604 indicating that the communication path was set up (317).

On the other hand, if Step 308 returns a YES answer (YES in Step 308), the process proceeds to Step 311, where the route setup portion 25 sets the value of the counter i to "1" (311).

After that, the route setup portion 25 determines whether the user ID "Le" that occupies an entry whose hash output value Ai is Hi (L) in the entry table Ei can be relocated to the entry table E(i+1) (312). If it is relocatable (YES in 312), the process proceeds to Step 316.

On the other hand, if it is not relocatable (NO in 312), the route setup portion 25 increments the counter i (313). Then, processing of Step 312 is repeated until the value of the counter i becomes equal to the number of entry tables imax (314).

When the value of the counter i becomes equal to the number of entry tables imax (YES in 314), the route setup portion 25 performs the relocation processing until it can secure the entry destination of the new user ID "L" (315). Specifically, the relocation processing that was described above is performed using FIG. 14A to FIG. 16B.

When the process proceeds to Step 316, the route setup portion 25 relocates the entry table 29c, and adds an entry of the new user ID "L," and updates the entry number table 30 (316). Subsequently, the process proceeds to Step 310.

By the processing shown above, the route setup portion 25 adds the new entry preferentially to the entry table 29c whose number of entries already set up is larger than those of the other entry tables 29c, i.e., the entry table 29c whose number of entries already set up is largest. As a result, between the entry table 29c to which the entry was added and the other entry tables 29c, the difference of the number of entries already set up becomes still larger. That is, a deviation arises in the number of entries already set up between the entry tables 29c.

This makes it possible to lower the occurrence probability of the collision at the time of adding an entry in the future. Moreover, by reducing an execution frequency of the relocation processing at the time of collision occurrence, it becomes possible to reduce a time of communication disconnection of the main signal frame.

Moreover, if there exist the entry tables 29c each of which has the largest number of entries already set up, the new entry will be preferentially added to the entry table 29c with a large table number (Ei). Thereby, it is possible to control that a large number of entries are setup in the entry table 29c with a large table number and a small number of entries are set up in the entry table 29c with a small table number. This makes it possible to lower the occurrence probability of the collision at the time of adding an entry in the future. Incidentally, an addition destination of the new entry is not limited to the entry table 29c with a large table number.

FIG. 9 is a sequence diagram showing one example of the entry addition processing of the first embodiment of the present invention. Here, a procedure in which the administrator of the bandwidth assured network N1 adds the entry of the new user ID "L" to the nodes 1, 2, and 3 using the network management server 6.

First, the administrator of the bandwidth assured network N1 inputs the setting command of a new communication path of the new user ID "L" that should be added by operating the input/output interfaces of the network management server (601). Following this, the network management server 6 transmits the value of the inputted user ID "L" and a communication path setting request 602 including information of the new communication path to the nodes 1, 2, and 3.

The route setup portion 25 of each node 1, 2, and 3 performs the entry addition processing of the user ID "L" based on the received communication path setting request 602 (603). The entry addition processing of the user ID "L" is as shown in FIG. 8 described above.

When the entry addition processing in Step 603 is ended, the monitor and control section 21 of each node 1, 2, and 3 transmits the communication path setting response 604 indicating that setup of the communication path is completed to the network management server 6. Upon reception of the communication path setting response 604, the network management server 6 outputs the setting result of the new communication path of the user ID "L" (for example, displaying it on a display) (605).

The processing shown above enables the administrator of the bandwidth assured network N1 to add the entry of the new user ID "L" to the nodes 1, 2, and 3 using the network management server 6.

Second Embodiment

A second embodiment of the present invention will be described below. Note that the explanation will be given below focusing on points different from the first embodiment described above.

In the first embodiment described above, the entry number table 30 (refer to FIG. 7A and FIG. 7B) manages the number of entries of the each entry table 29c. In this second embodiment, the entry number table 30 (refer to FIG. 12A and FIG. 12B) manages the "number of empty entries" that is the number of fields where no entries are setup of the each entry table 29c.

FIG. 10A is a diagram showing one example of the hash function H1 (28c-1) of the second embodiment of the present invention. FIG. 10B is a diagram showing one example of the hash function H2 (28c-2) of the second embodiment of the present invention. The hash functions 28c include the hash function H1 (28c-1) shown in FIG. 10A and the hash function H2 (28c-2) shown in FIG. 10B.

FIG. 10A and FIG. 10B show the correspondence between the input value (the user ID value) and the output value in the case where the number of user IDs that can be set in the node 1 (or the node 2 or the node 3) is four.

Incidentally, the hash functions H1, H2 of the second embodiment of the present invention are each a function of converting the 20-bit user ID, i.e., a value in a range of zero to 1,048,575 into a value of a range equal to or less than the number of the user IDs that can be set in the node 1 (or the node 2 or the node 3).

The hash function H1 shown in FIG. 10A inputs the 20-bit user ID, i.e., an input value expressed by a value in a range of zero to 1,048,575, and outputs evenly the 2-bit number corresponding to the input value, i.e., the output value A1 expressed by a value in a range of zero to three. For example, if the input value is the user ID equal to anyone of "0", "1", "14", - - - , the output value A1 will be zero.

The hash function H2 shown in FIG. 10B inputs the 20-bit user ID, and outputs evenly the output value A2 expressed by a value in a range of zero to two corresponding to the input value. For example, if the input value is the user ID equal to any one of "0", "4", "9", - - - , the output value A2 will be zero.

The route setup portion 25 can compress the value range of the user ID into a range having a value equal to or less than the number of the user IDs by using the hash functions H1, H2 shown above.

Incidentally, it is mounted as hardware to which these hash functions H1, H2 are implemented as hardware for executing logical expressions such as a CRC (Cyclic Redundancy Check) operation and a remainder arithmetic operation, for example. Incidentally, by being equipped with these hash functions H1, H2, the node 1 is enabled to reduce the occurrence probability of the collision as compared with the case where only one hash function is available. Moreover, although the case where the node 1 is equipped with the two hash functions H1, H2 has been explained here, it may be equipped with three hash functions or more.

Moreover, in the second embodiment of the present invention, a value range smaller than the settable number of user IDs is allowed as output value ranges of the hash functions H1, H2. Moreover, numbers that the output values of the hash functions H1, H2 can take are different mutually. This makes possible flexible management of the entry table 29 appropriate to a mounted memory size.

FIG. 11A and FIG. 11C are diagrams showing one example of the entry table E1 (29c-1) of the second embodiment of the present invention. FIG. 11B and FIG. 11D are diagrams showing one example of the entry table E2 (29c-2) of the first embodiment of the present invention. The entry tables 29c include the entry table E1 (29c-1) shown in FIG. 11A (or FIG. 11C) and the entry table E2 (29c-2) shown in FIG. 11B (or FIG. 11D).

Incidentally, FIG. 11A and FIG. 11B show the entry tables E1, E2 before the change, respectively. On the other hand, FIG. 11C and FIG. 11D show the entry tables E1, E2 after the change, respectively. Processings from before to after the change will be described later in a concrete example of FIG. 13.

The entry table E1 is an entry table corresponding to the hash function H1 of FIG. 10A. That is, it manages a correspondence among the hash output value A1 (241) of the hash function H1, the user ID "L0" (242), and the internal ID (243).

On the other hand, the entry table E2 is an entry table corresponding to the hash function H2 of FIG. 10B. That is, it manages a correspondence among the hash output value A2 (248) of the hash function H2, the user ID "L0" (249), and the internal ID (250).

Incidentally, in the entry table E1, the values that the hash output value A1 (241) can take are four values of zero to three. On the other hand, in the entry table E2, the values that the hash output value A2 (248) can take are three values of zero to two.

By using the entry tables E1, E2 shown above, the route setup portion 25 can convert the user IDs with the value ranges compressed by the hash functions H1, H2 into the internal IDs at high speed. Incidentally, although the case where the node 1 is equipped with the two entry tables E1, E2 has been explained here, if the number of hash functions is three or more, the node may be equipped with three or more entry tables which is the same as the number of hash functions.

FIG. 12A and FIG. 12B are diagrams showing one example of the entry number table 30 of the second embodiment of the present invention. FIG. 12A shows the entry number table 30 before the change, which corresponds to the entry tables E1, E2 shown in FIG. 11A and FIG. 11B. On the other hand, FIG. 12B shows the entry number table 30 after the change, which corresponds to the entry tables E1, E2 shown in FIG. 11C and FIG. 11D.

The entry number table 30 manages the identifier (281) of the each entry table 29c, the table size (282) representing the number of entries that can be set in the each entry table 29c, the number of entries already set up in the each entry table 29c, and a correspondence of the number of empty entries (284) that is the number of fields where no entries are set up of the each entry table 29c, i.e., the number of empty entries of the entry table 29c (the number of fields where no entries are set up).

In the entry table E1 shown in FIG. 11A, the settable number of entries is four, the number of entries already set up is zero, and the number of fields where no entries are set up is four. Moreover, in the entry table E2 shown in FIG. 11B, the settable number of entries is three, the number of entries already set up is one, and the number of fields where entries are set up is two. Therefore, in the entry number table 30 shown in FIG. 12A, registration is made such that the table size of the entry table E1 is four, and the number of entries is zero, and the number of empty entries is four. Similarly, registration is made such that the table size of the entry table E2 is three, the number of entries is one, and the number of empty entries is two.

On the other hand, in the entry table E1 shown in FIG. 11C, the settable number of entries is four, the number of entries already set up is zero, and the number of fields where no entries are set up is four. Moreover, in the entry table E1 shown in FIG. 11A, the settable number of entries is three, the number of entries already set up is two, and the number of fields where no entries are set up is one. Therefore, in the entry number table 30 shown in FIG. 12B, registration is made such that the table size of the entry table E1 is four, the number of entries is zero, and the number of empty entries is four. Similarly, registration is made such that the table size of the entry table E2 is three, the number of entries is two, and the number of empty entries is one.

As described above, the entry number table 30 manages the number of empty entries that is the number of fields where no entries are set up of the each entry table 29c. This enables the node 1 to select the entry table 29c in the registration destination of the new entry depending on an entry unset-up status in the each entry table 29c. Incidentally, the columns of the table size 282 and the number of entries 283 may be not provided.

Figure 13:
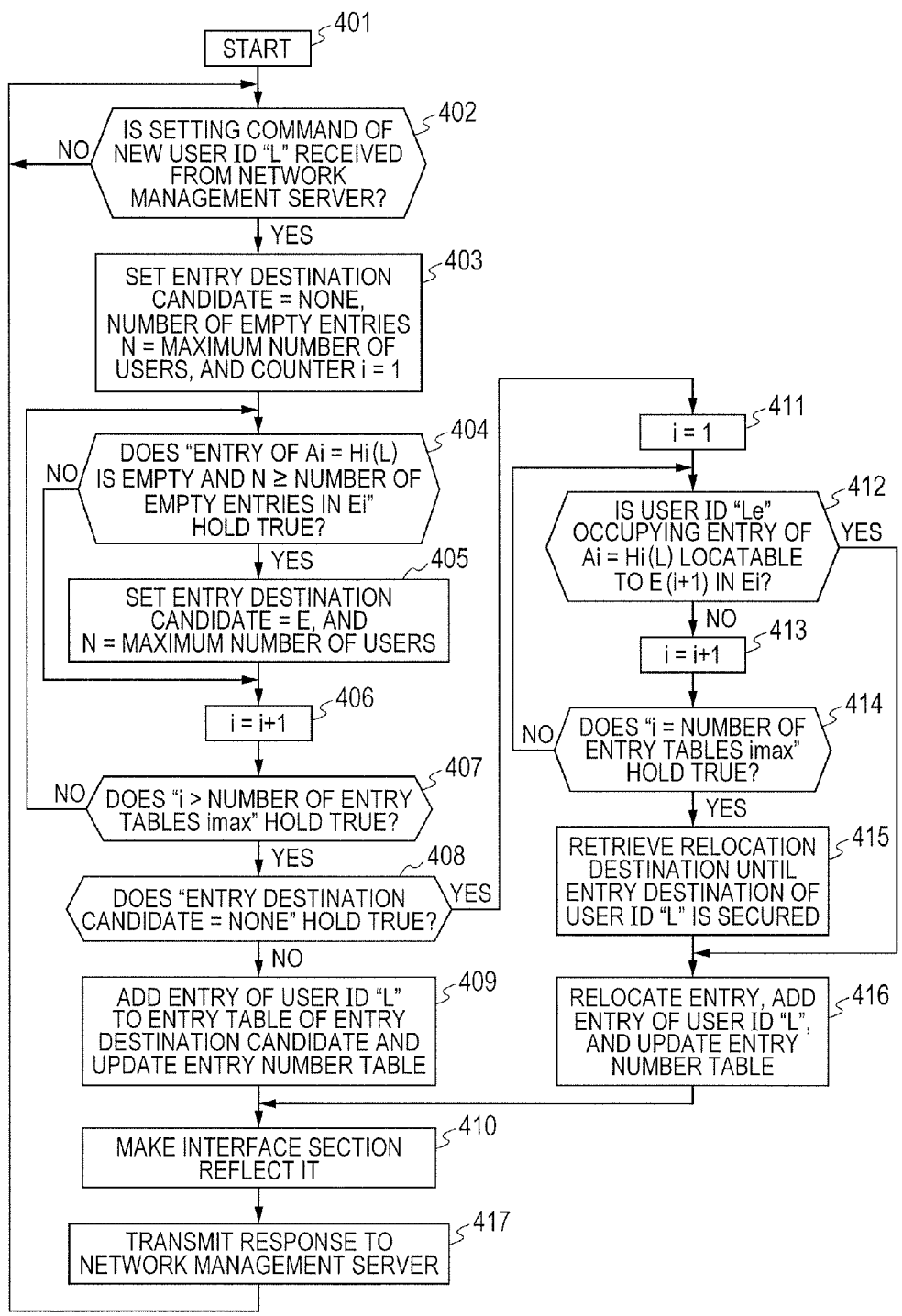
FIG. 13 is a flowchart showing one example of an entry addition processing of the second embodiment of the present invention.

FIG. 13 is a flowchart showing one example of the entry addition processing of the second embodiment of the present invention. Here, a procedure in which the route setup portion 25 adds (registers) the new entry to the entry table 29c will be explained using a concrete example.

The route setup portion 25 will be in a waiting state after the processing starts (401) until it receives the setting command of the new user ID (e.g., the user ID "L") from the network management server 6 (402). When receiving the setting command of the new user ID "L" (YES in 402), it sets "NONE" in the variable "entry destination candidate, sets four that is the settable number of user IDs in the variable N representing the number of empty entries, and sets one in the counter i, respectively (403).

Next, in the entry table Ei, the route setup portion 25 determines whether an entry whose hash output value Ai is Hi (L) is empty and whether the value of the variable N is equal to or more than the number of empty entries of the entry table Ei (404). Incidentally, Hi (L) is the output value of the hash function Hi to the input value L.

Specifically, first, it retrieves an entry whose hash output value A1 is Hi (L) from the entry table E1 (FIG. 11A), and checks whether the pertinent entry is empty. For example, when receiving the setting command of the new user ID "L=2" in Step 402, the output value of the hash function H1 (FIG. 10A) to the input value two is one. That is, H1 (2)=1 holds true. Therefore, it checks that the entry whose hash output value A1 is one is empty from the entry table E1 (FIG. 11A).

Next, it compares the value of the variable N (here, initial value 4) and the number of empty entries of the entry table E1 referring to the entry number table 30 (FIG. 12A). In the entry number table 30 (FIG. 12A), the number of empty entries of the entry table E1 is four. Therefore, the value of the variable N is equal to or more than the number of empty entries of the entry table E1. From the above, Step 404 returns a YES answer.

If Step 404 returns a YES answer, the route setup portion 25 will set "Ei" in the variable "entry destination candidate", and set "the number of empty entries of the entry table Ei" in the variable N (405). In the above-mentioned concrete example, it sets "Ei" in the variable "entry destination candidate", and sets four that is "the number of empty entries of the entry table Ei" in the variable N (405). On the other hand, if Step 404 returns a NO answer (NO in 404), the processing of Step 405 will not be performed.

When the process proceeds to Step 406, the route setup portion 25 increments the counter i (406). In the above-mentioned concrete example, the counter i becomes i=2.

Then, the route setup portion 25 determines whether a value of the counter i is larger than the number of entry tables imax (407). If the value of the counter i is equal to or less than the number of entry tables imax (NO in 407), the process will return to Step 404, where the processing will be repeated. On the other hand, if the value of the counter i is larger than the number of entry tables imax (YES in 407), the process will proceed to Step 408.

In the above-mentioned concrete example, the value of the counter i is two and the value of the number of entry tables imax is two (two of the entry tables E1, E2). Therefore, the value of the counter i is equal to or less than the number of entry tables imax (NO in 407), and accordingly the process returns to Step 404.

When the process returns to Step 404, the route setup portion 25 retrieves the entry whose hash output value A2 is H2 (2) from the entry table E2 (FIG. 11B), and checks whether the pertinent entry is empty. The output value of the hash function H2 (FIG. 10B) to the input value two is two. That is, H2 (2)=2 holds true. Therefore, it checks that the entry whose hash output value A2 is two is empty from the entry table E2 (FIG. 11B).

Next, it compares the value of the variable N (here 4) and the number of empty entries of the entry table E2, referring to the entry number table 30 (FIG. 12A). In the entry number table 30 (FIG. 12A), the number of empty entries of the entry table E2 is two. Therefore, the value of the variable N is equal to or more than the number of empty entries of the entry table E2. From the above, Step 404 returns a YES answer.

The process proceeds to Step 405, where the route setup portion 25 sets "E2" in the variable "entry destination candidate," and sets two that is the number of empty entries of the entry table E2 in the variable N (405). Then, it increments the counter i to i=3 (406). Then, since the value of the counter i is larger than the number of entry tables imax (=2) (YES in 407), the process proceeds to Step 408.

By the processings of Steps 404 to 407 shown above, the route setup portion 25 determines the entry table whose number of empty entries is smallest as the registration destination candidate of the new entry using the variable "entry destination candidate" and the variable N.

In Step 408, the route setup portion 25 checks whether the value of the variable "entry destination candidate" is "NONE" (408). If the value of the variable "entry destination candidate" is "NONE" (YES in 408), the process will proceeds to Step 411. On the other hand, if the value of the variable "entry destination candidate" is not "NONE" (NO in 408), the process will proceed to Step 409. In the above-mentioned concrete example, since the value of the variable "entry destination candidate" is "E2" (NO in 408), the process proceeds to Step 409.

In Step 409, the route setup portion 25 adds the entry of the user ID "L" to the entry table expressed by the variable "entry destination candidate," and updates the entry number table 30 (409).

In the above-mentioned concrete example, since the value of the variable "entry destination candidate" is "E2," it adds the entry of the user ID "2" to the entry table E2. Incidentally, when adding the new entry, the internal ID related to the new entry shall be a unique value in all the entry tables E1, E2. As a result, it changes the entry Table E1 shown in FIG. 11A and the entry Table E2 shown in FIG. 11B into an entry Table E1 shown in FIG. 11C and an entry table E2 shown in FIG. 11D, respectively.

Moreover, it updates the entry number table 30. In the above-mentioned concrete example, since the number of empty entries of the entry table E2 is changed from two to one, the entry number table 30 shown in FIG. 12A is changed into the entry number table 30 shown in FIG. 12B.

Then, in Step 410, the route setup portion 25 transmits information of the entry tables E1 and E2 (29c) after the change to the respective interface sections 22a, 22b (410). The interface sections 22a, 22b overwrite (update) the received information of the entry tables E1, E2 (29c) after the change into the entry tables 29a, 29b with which the respective interface sections 22a, 22b are equipped, respectively. Subsequently, in Step 417, the monitor and control section 21 transmits up to the network management server 6 the communication path setting response 604 indicating that the communication path was set up (417).

Incidentally, regarding processings in Steps 411 to 416, their explanations are omitted here noting that they are the same as processings of the above-mentioned Steps 311 to 316.

Through the processings shown above, the route setup portion 25 preferentially adds the new entry to the entry table 29c having a fewer number of fields where no entries are set up than those of the other entry tables 29c, i.e., the entry table 29c having a smallest number of fields where no entries are set up. As a result, a difference in the number of fields where no entries are set up becomes still larger between the entry table 29c to which the entry was added and the other entry table 29c. That is, a deviation will arise in the number of fields where no entries are set up among the entry tables 29c.

This makes it possible to lower the occurrence probability of the collision at the time of adding an entry in the future. Moreover, by reducing the execution frequency of the relocation processing at the time of the collision occurrence, it becomes possible to reduce the time of the communication disconnection of the main signal frame.

Moreover, if there exist the entry tables 29c each having the smallest number of fields where no entries are set up, the route setup portion 25 will preferentially add the new entry to the entry table 29c with a large table number (Ei). Thereby, it is possible to control so that a large number of entries may be set up in the entry table 29c with a large table number and a small number of entries may be set up in the entry table 29c with a small table number. This makes it possible to lower the occurrence probability of the collision at the time of adding an entry in the future. Incidentally, the addition destination of the new entry is not limited to the entry table 29c with a large table number.

According to each embodiment shown above, in the identifier management apparatus for performing a processing using the hash function (e.g., a communication device, and a cipher-processing device), it is possible to add the new entry effectively to multiple entry tables on memory with a limited size.

That is, when adding the new entry, if there are multiple entry tables to each of which the new entry can be added, the identifier management apparatus will select an optimal addition destination for the new entry depending on the entry setting status, referring to the entry number table 30. Thereby, when an entry will be added in the future, it is possible to avoid the relocation processing of the entry already set up or to reduce the execution frequency of the relocation processing. Moreover, the identifier management apparatus can add the new entry without affecting an identifier conversion processing of the entry already set up. Especially, in the communication system of providing the band guarantee service, the identifier management apparatus can prevent the communication disconnection of the user related to the entry already set up and add the new entry.

Although the embodiments of the present invention were explained in the foregoing, each embodiment described above shows one of application examples of the present invention, and it is not meant that a technical scope of the present invention is limited to the specific configuration of the each embodiment described above.

For example, although in the above-mentioned explanations, the case where the present invention was applied to the bandwidth assured network N1 based on MPLS-TP has been explained as an example, the present invention is not limited to this case. For example, it is applicable to a communication device inside the communication system that manages communication connection based on the user id of each user of asynchronous transfer mode (ATM), Ethernet (registered trademark), virtual local area network (VLAN), etc.

What is claimed is:

1. An identifier management apparatus comprising:
a processor that executes a program and that converts an identifier given to communication data; and
memory that stores the program executed by the processor, wherein
the memory stores a plurality of hash functions, for each hash function, a plurality of entry tables for managing identifier conversion information showing a correspondence between an output value of the hash function, an input identifier being an input value of the hash function, and an output identifier obtained by converting the input identifier,
a management table manages a setting status of the identifier conversion information in each of the entry tables,
when the processor registers new identifier conversion information in any one of the entry tables, the processor
selects one of the entry tables referring to the setting status of the identifier conversion information of the plurality of entry tables managed by the management table, and
updates the selected one of the entry tables, and
at least two hash functions of the hash functions output the output values of mutually different ranges, respectively, and each of the entry tables manages pieces of the identifier conversion information whose number is equal to or less than the number of the output values of the hash function corresponding to the entry table.

2. The identifier management apparatus according to claim 1, wherein the processor selects the entry table that should register the new identifier conversion information so that a deviation among the entry tables may arise in the setting status of the identifier conversion information in the entry tables.

3. The identifier management apparatus according to claim 1,
wherein the management table manages the number of fields where entries are set up of the identifier conversion information in the entry tables and the processor selects an entry table whose number of fields where entries are set up is larger than those of the other entry tables.

4. The identifier management apparatus according to claim 1,
wherein the management table manages the number of fields where no entries are set up of the identifier conversion information in each of the entry tables, and the processor selects an entry table whose number of fields where no entries are set up is smaller than those of other entry tables from the entry tables.

5. An identifier management apparatus comprising:
a processor that executes a program and that converts an identifier given to communication data and
memory that stores the program executed by the processor, wherein
the memory stores a plurality of hash functions, output values of the hash functions corresponding to the respective hash functions, a plurality of entry tables for managing identifier conversion information showing a correspondence between an input identifier being an input value of the hash function and an output identifier obtained by converting the input identifier,
a management table manages a setting status of the identifier conversion information in each of the entry tables,
when the processor registers new identifier conversion information in any one of the entry tables, the processor
selects an entry table that should register the new identifier conversion information depending on a setting status of the identifier conversion information in each of the entry tables managed by a control table,
the management table manages the number of fields where no entries are set up of the identifier conversion information in each of the entry tables, and the processor selects an entry table whose number of fields where no entries are set up is smaller than those of other entry tables from the entry tables, and
at least two hash functions of the hash functions output the output values of mutually different ranges, respectively, and each of the entry tables manages pieces of the identifier conversion information whose number is equal to or less than the number of the output values of the hash function corresponding to the entry table.

6. An identifier management method in an identifier management apparatus which comprises a processor that executes a program and that and converts an identifier given to communication data, and memory that stores the program executed by the processor, the method comprising:
storing in the memory a plurality of hash functions, for each hash function, a plurality of entry tables for managing identifier conversion information that shows a correspondence between an output value of the hash function, an input identifier being an input value of the hash function, and an output identifier obtained by converting the input identifier; and
managing, using a management table, a setting status of the identifier conversion information in each of the entry tables, wherein
when registering new identifier conversion information in any one of the entry tables, the method further comprises
selecting one of the entry tables referring to the setting status of the identifier conversion information of the plurality of entry tables managed by the management table,
updating the selected one of the entry tables, and
registering the new identifier conversion information in the selected entry table that should register, and
at least two hash functions of the hash functions output the output values each of which is in a different range, and each of the entry tables manages pieces of the identifier conversion information whose number is equal to or less than the number of output values of the hash function corresponding to the entry table.

7. The identifier management method according to claim 6,
wherein in the procedure to select, the processor selects an entry table that should register the new identifier conversion information so that a deviation among the entry tables may be in the setting status of the identifier conversion information of the entry tables.

8. The identifier management method according to claim 6,
wherein the management table manages the number of fields where entries are set up of the identifier conversion information in each of the entry tables, and
wherein in the procedure to select, the processor selects an entry table whose number of entries is larger than those of other entry tables.

9. The identifier management method according to claim 6,
wherein a control table manages the number of fields where no entries are set up of the identifier conversion information in each of the entry tables, and in the procedure to select, the processor selects an entry table whose number of fields where no entries are set up is smaller than those of other entry tables.

10. An identifier management method in an identifier management apparatus which comprises a processor that executes a program and that converts an identifier given to communication data, and memory for storing the program executed by the processor, the method comprising:
storing in the memory a plurality of hash functions, output values of the hash functions corresponding to the hash functions, a plurality of entry tables for managing identifier conversion information that shows a correspondence between an input identifier being an input value of the hash function and an output identifier obtained by converting the input identifier; and
managing, using a management table, a setting status of the identifier conversion information in each of the entry tables, wherein
when registering new identifier conversion information in any one of the entry tables, the method further comprises
selecting an entry table that should register the new identifier conversion information depending on the setting status of the identifier conversion information in each of the entry tables managed by a control table, and
registering the new identifier conversion information in the selected entry table that should register, the control table manages the number of fields where no entries are set up of the identifier conversion information in each of the entry tables, and in the procedure to select, the processor selects an entry table whose number of fields where no entries are set up is smaller than those of other entry tables, and at least two hash functions of the hash functions output the output values each of which is in a different range, and each of the entry tables manages pieces of the identifier conversion information whose number is equal to or less than the number of output values of the hash function corresponding to the entry table.

\* \* \* \* \*